July 3, 1956 A. WULLSCHLEGER 2,752,693
SPIRIT LEVEL
Filed Oct. 24, 1951

INVENTOR
ALBERT WULLSCHLEGER

Greene, Pineles & Durr
ATTORNEYS

United States Patent Office 2,752,693
Patented July 3, 1956

2,752,693
SPIRIT LEVEL

Albert Wullschleger, Weiningen, near Zurich, Switzerland

Application October 24, 1951, Serial No. 252,954

4 Claims. (Cl. 33—211)

The invention relates to a spirit level having a body consisting of transparent material, the bore of which is closed by a closure disc.

It is a main object of the invention to provide means for providing a complete and secure seal of the bore of a spirit level body.

It is another main object of the invention to provide a method for completely and securely sealing the bore of a spirit level body.

According to a main feature of the seal according to the invention the said seal of the bore comprises a disc of plastically deformable material such as lead pressed into at least one recess of the spirit level body.

According to a main feature of the process according to the invention the bore is firstly covered by the closure disc, and then the plastically deformable material is pressed over the same and into at least one recess of the spirit level body, whereafter the spirit level liquid is filled in through a narrow bore, and eventually the filler opening is closed.

Further objects and features of the invention may appear from the description of two embodiments thereof given by way of example with reference to the accompanying drawing, and while these embodiments may be considered as typical and as particularly useful, I wish it to be understood that I do not limit myself to the details and dimensions described and illustrated, for obvious modifications will occur to a person skilled in the art.

Figure 1:
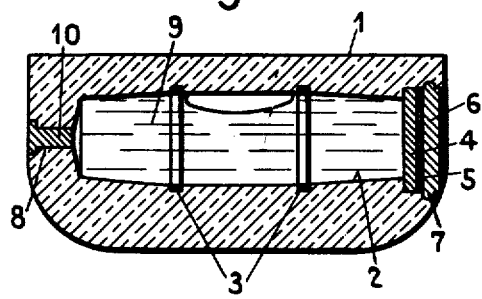
Fig. 1 shows a longitudinal section through a spirit level having a barrel shaped bore.
Figure 2:
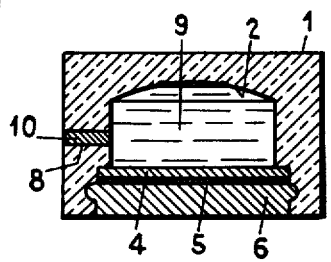
Fig. 2 is an axial section through a boxshaped spirit level with correspondingly shaped bore.

In the drawing, the spirit level body in all embodiments is denoted 1, and consists of transparent artificial material. In this body, a bore 2, which in the embodiment according to Fig. 1 is barrel shaped, is provided. In the inner wall of the bore 2 circular clips 3 are inserted which facilitate the reading of the position of the spirit level bubble. The closure of the bore 2 is effected by means of a closure disc 4, e. g. of aluminium. The same is covered by a resilient intermediate layer 5 which may consist for example of rubber. On top of the latter there is provided according to the invention a plate 6 of a plastically deformable material, preferably of lead. In the embodiment of Figs. 1 and 2 this plate is pressed into a groove running circumferentially, and is thereby fixedly anchored in the body 1.

Figure 3:
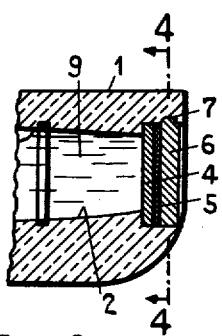
Fig. 3 is a longitudinal part section of a modification of the spirit level of Fig. 1.
Figure 4:
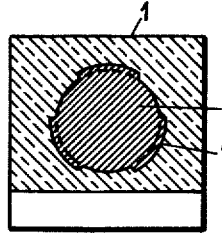
Fig. 4 is a cross section on the line 4—4 of Fig. 3.
Figure 5:
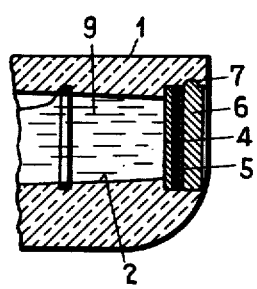
Fig. 5 is a longitudinal part section of another modification of Fig. 3.

Instead of a single recess 7 extending over the whole circumference, alternatively several recesses 7, distributed over the circumference could be provided, as shown in Figs. 3 and 4.

Opposite the closure disc 4 there is the filler opening 8 for the spirit level liquid 9. This filler opening has a considerably smaller cross section than the opening of the spirit level body which is closed by the closure disc. It is therefore easily possible to accurately dose the quantity of the liquid to be filled in. After the filling in of this liquid the filler opening is closed by a stopper 10, e. g. of lead.

The embodiment according to Fig. 2 is distinguished by the shape of the spirit level body 1 which is here constructed cylindrically. The spirit level bore 2 has an appropriate corresponding shape and is again closed by a closure disc 4, e. g. of aluminium. Between this closure disc and the lead body 6 there is again a rubber plate 5. The filling-in of the spirit level liquid is effected, here too, through a separate opening, which has a considerably smaller cross section than the opening of the spirit level bore 2 closed by the closure disc 4. This filler opening 8 is closed, also in this case, by a lead stopper 10.

Instead of lead, another suitable metal which is plastically deformable can be used for the plate 6. For example the use of tin or of alloys is conceivable which have the property of entering into recesses of the spirit level body 1 when pressure is exerted on them.

In order to secure readability even in darkness, the spirit level body may be provided at suitable places with a luminous layer. For example the side of the closure disc 4 facing towards the plate 6 can be provided with such a layer. The disc 4 is in this case made of transparent material, the same as the spirit level body.

Figure 6:
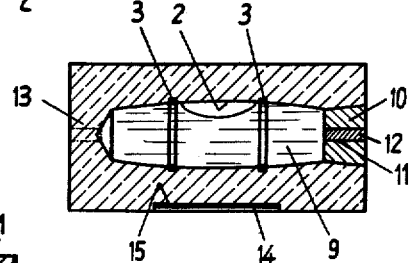

Figure 6 shows a further modification of the invention. Similar parts are denoted by the same reference characters as in the Figures 1 to 5. The difference lies in the closure of the spirit level bore which according to the modification of Figure 6 is closed by means of a stopper 10 consisting for instance of a transparent artificial or synthetic resin. The stopper 10 may be fixed to the body of the spirit level by means of an adhesive. In the modifications shown the stopper is transversed by a central bore 11 through which the liquid 9 is filled into the bore. The bore 11 is closed by means of a cylindrical or slightly conical pin 12.

Instead of arranging filling bore 11 and the pin 12 in the stopper 10 they might also be arranged in the wall 13 opposite the stopper as indicated in dotted lines in Figure 6.

Below the circular clips 3 a layer 14 of luminous material may be arranged in a recess 15 of the spirit level body 1.

Figure 7:
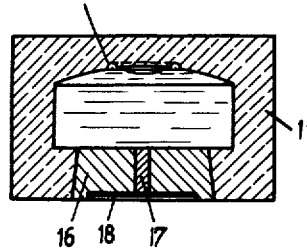
Figs. 6 and 7 show two further modifications of the spirit level of the invention.

In the modification represented in Figure 7 a marking ring 3' is recessed into the top side of the cylindrical spirit level body the bottom of which is closed by means of a conical stopper 16 through which passes a closure pin 17 of metal, for instance of lead. The outer wall of the stopper is recessed in respect of the adjoining parts of the spirit level body and the recess thus created is filled with luminous material 18.

What I claim as my invention and desire to secure by Letters Patent, is:

1. A method of producing a spirit level comprising the steps of providing a solid body of transparent resinous material having a smooth upper surface, forming a bore for the spirit liquid beneath the said upper surface extending into the central part of said body from one of the other surfaces thereof, said bore being connected to an outside surface of the body by a frustoconical opening, fitting a frustoconical stopper containing a small substantially cylindrical and substantially axial opening therethrough into the frustoconical opening of said bore, filling the liquid of the level through said last named opening and plugging said small opening with a cylindrical plug extending substantially the full length of the opening.

2. A spirit level comprising a body of transparent resinous material having a smooth upper surface and a bore extending from a second surface thereof into the central portion thereof, the said bore having a frustoconical open end converging from said second surface toward the central portion of said body for a substantial distance, a frustoconical stopper of resinous material containing a small axial opening therethrough in sealing engagement with said frustoconical open end of said bore, and a plug filling the opening in said stopper.

3. The spirit level as set forth in claim 2 in which said plug is made of plastically deformable metallic material.

4. The level as set forth in claim 2 in which the bore extends from a surface of the body which is opposite said smooth top surface with the axis of said bore extending substantially perpendicularly to said top surface, the side of said bore nearest the smooth top surface being dome-shaped.

References Cited in the file of this patent

UNITED STATES PATENTS

| | | |
|---|---|---|
| 44,852 | Colburn | Nov. 1, 1864 |
| 592,537 | Carriere | Oct. 26, 1897 |
| 666,843 | Brownell | Jan. 29, 1901 |
| 801,683 | Penfold | Oct. 10, 1905 |
| 1,198,134 | Kercher | Sept. 12, 1916 |
| 1,318,162 | Loring | Oct. 7, 1919 |
| 1,445,131 | Day et al. | Feb. 13, 1923 |
| 1,641,269 | Hoke | Sept. 6, 1927 |
| 1,773,855 | Peters | Aug. 26, 1930 |
| 1,801,006 | Jacoby | Apr. 14, 1931 |
| 1,992,605 | Clifford et al. | Feb. 26, 1935 |
| 2,045,126 | Deems | June 23, 1936 |
| 2,084,973 | John | June 22, 1937 |
| 2,344,241 | Flint | Mar. 14, 1944 |
| 2,362,872 | Weagle | Nov. 14, 1944 |
| 2,514,492 | Hayward | July 11, 1950 |
| 2,627,121 | Moyer et al. | Feb. 3, 1953 |